United States Patent [19]

Gazuit

[11] 4,105,379

[45] Aug. 8, 1978

[54] TIRE CURING PRESS

[75] Inventor: Georges Gazuit, Montlucon, France

[73] Assignee: Etablissements Zelant, Gazuit, Montlucon, France

[21] Appl. No.: 823,685

[22] Filed: Aug. 11, 1977

[30] Foreign Application Priority Data

Aug. 25, 1976 [FR] France .............................. 76 25681

[51] Int. Cl.² ............................................... B29H 5/02
[52] U.S. Cl. ............................................ 425/47; 425/38; 425/DIG. 5; 425/185; 425/450.1
[58] Field of Search .......... 425/38, 47, 450.1, DIG. 5, 425/35, 345, 352, 353, 354, 355, 17, 19, 406, 20, 33, 40, 185

[56] References Cited

U.S. PATENT DOCUMENTS

| | | | |
|---|---|---|---|
| 2,058,233 | 10/1936 | Iverson | 425/47 |
| 2,820,458 | 4/1959 | Frohlick et al. | 425/32 X |
| 3,118,183 | 1/1964 | Gex et al. | 425/353 |
| 3,222,715 | 12/1965 | Harris | 425/32 |
| 3,230,905 | 1/1966 | Gojda | 425/345 |
| 3,936,251 | 2/1976 | Billey | 425/38 |
| 4,028,168 | 6/1977 | Wolfe | 425/40 X |

*Primary Examiner*—J. Howard Flint, Jr.
*Attorney, Agent, or Firm*—Amster, Rothstein & Engelberg

[57] ABSTRACT

A press for the vulcanization of tires comprising a horizontal cross-member which is mounted in a cantilever fashion at one of its ends on a support having a vertical axis, and which is able to both pivot about and to slide along the vertical axis of said support. In order to control both the pivoting and sliding movements of the horizontal cross-member, there is provided a single control means associated with guide means comprising a cam follower member and a groove forming a cam having two end portions which extend vertically and which are one another offset vertically and angularly in relation to axis of support, and an intermediate portion progressively connecting the two end portions of the groove.

3 Claims, 1 Drawing Figure

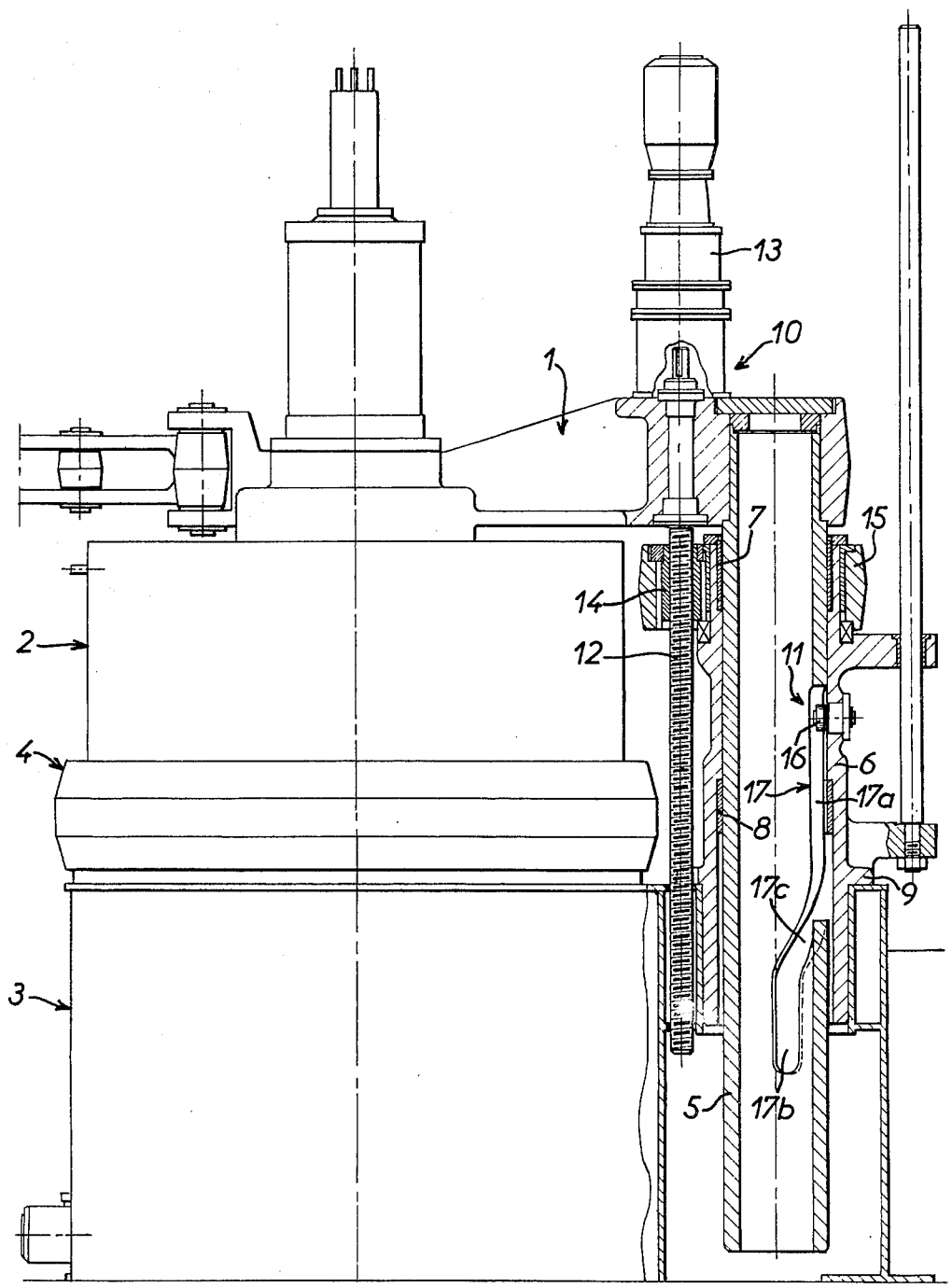

TIRE CURING PRESS

BACKGROUND OF THE INVENTION

1. Field of the Invention

The present invention relates to a press, particularly for the vulcanisation of tires, of the type generally disclosed in U.S. Pat. No. 3,936,251, comprising a horizontal cross-member which is mounted in a cantilever fashion at one of its ends on a support having a vertical axis, and which is able to both pivot about and slide along the vertical axis of the support.

2. Description of the Prior Art

In the two embodiments described in U.S. Pat. No. 3,936,251, the vertical movements and the pivoting movements of the horizontal cross-member are controlled by separate control means. The result is a complication in the construction of the press and of the associated programming means which controls the sequence of operations carried out by the parts of the press.

SUMMARY OF THE INVENTION

The main object of the present invention is to provide improved means for controlling the vertical and pivoting movements of the horizontal cross-member, which permits a simplification of the construction of the press and of its associated programming means and, consequently, to reduce its cost price, and which, from a mechanical point of view, permits a repetitivity of the movements to be obtained, which is a regularity factor of the curing and so of productivity.

To this end, the press of the present invention is characterized in that, to control both the pivoting and sliding movements of the horizontal cross-member, there is provided a single control means associated with guide means comprising a cam follower member and a groove forming a cam having two end portions, which extend vertically and which are one another offset vertically and angularly in relation to the axis of the support, and an intermediate portion progressively connecting the two end portions of the groove.

According to one embodiment of the present invention, the support comprises two parts able to slide one in the other and to rotate in relation to each other, a first one of the two parts of the support being rigidly fixed to the frame of the press, whereas the second part of the support is rigidly fixed to the crossmember, the cam follower member being carried by one of the two parts of the support, whereas the cam forming groove is provided in the other part of the support.

BRIEF DESCRIPTION OF THE DRAWING

A detailed description of a preferred embodiment of the invention will now be given with reference to the single FIGURE of the accompanying drawings which represents partly in elevation and partly in vertical section, a vulcanization press of the present invention.

DESCRIPTION OF THE PREFERRED EMBODIMENT

The vulcanization press shown in the drawings comprises a horizontal cross-member 1, to which is fixed the upper part 2 of the mold which, when cross member 1 is in its lower position, may be locked in relation to frame 3 of the press supporting the lower part (not shown) of the mold by means of a locking device 4 of the bayonet type.

At one of its ends, cross-member 1 is rigidly fixed to the upper end of a hollow cylindrical column 5. Column 5 is slidably and rotatably mounted in a vertically extending hollow cylindrical shaft 6 through two bearings 7 and 8. Shaft 6 is rigidly fixed to frame 3 of the press, for example by means of a securing collar 9 and bolts (not shown);

Thus, cross-member 1 can move vertically and pivot about the vertical axis of shaft 6. According to the present invention, the vertical sliding and pivoting movements of the assembly of the cross-member 1 and column 5 are controlled by a single control means 10 associated with guide means 11.

The single control means 10 is formed by a known screw and ball nut system, the screw 12 of which is rotated by a motor 13. In the embodiment shown, motor 13 and screw 12 are supported by the cross-member 1 so that screw 12 extends downwards below cross-member 1 parallel to the vertical column 5. The ball nut 14 is rigidly fixed to an element 15 which is rotatably mounted, without any possibility of axial movement, on shaft 6 at the upper part thereof.

Guide means 11 comprises a cam follower member or roller 16 which is mounted in the hollow shaft 6 so as to project towards the inside thereof and which engages in a groove 17 forming a cam provided in the cylindrical wall of column 5. Groove 17 comprises two end portions 17a and 17b which extend vertically and are one another offset vertically and angularly in relation to the axis of column 5 and of shaft 6, and an intermediate portion 17c, for example of helical shape, which progressively connects the two end portions 17a and 17b to each other. The angular offset between the two portions 17a and 17b of the groove 17 is equal to the angle through which cross-member 1 must be able to pivot to go from a first position in which the upper part 2 of the mold is vertically aligned with the lower part of the mold for curing of a tire, to a second position, in which the upper part 2 of the mold is vertically aligned with a discharge station (not shown) provided on one side of frame 3 of the press for discharging a tire which has just been vulcanised.

With such an arrangement, when locking device 4 is released at the end of a vulcanization operation and when screw 12 is rotated in a first direction by motor 13, screw 12 rises by interaction with ball nut 14 which is fixed, and takes along with it in its elevational movement cross-member 1 and column 5. During this elevational movement of column 5, roller 16 travels along portion 17a of groove 17, forcing column 5 to move vertically, without possibility of rotational movement. The length of portion 17a of groove 17 is chosen so that cross-member 1 may rise sufficiently for the upper part 2 of the mold to free itself completely from the lower part of the mold and to prevent any interference therewith during the consecutive pivoting movement of cross-member 1. As soon as roller 16 arrives at the lower end of portion 17a of groove 17 and engages in the helical portion 17c of said groove, it imparts to column 5 and to cross-member 1, besides their vertical movement, a rotational movement about the axis of shaft 6, so as to force cross-member 1 to go from said first position to said second position. As soon as cross-member 1 has reached the second said position, roller 16 leaves portion 17c of groove 17 to engage in vertical portion 17b. From this moment on, column 5 and cross-member 1 have only a vertical movement. It is clear that, if screw 12 is then rotated in a second direction opposite the first direction, cross-member 1 will be brought to its first position for the vulcanization of another crude tire laid on the lower part of the mold by an automatic loader (not shown) which is preferably carried by cross-member 1 so as to be able to move therewith, in order to load the lower part of the mold with a crude tire while the discharge operation of the tire which has just been vulcanised takes place.

Thus, as it is clear from the foregoing, the present invention allows a simplification of the construction of the press and of the associated programming means since there is no need of a second motor or actuator for controlling the pivoting movements of the cross-member nor of control electrical circuits usually associated with said second motor or actuator. Furthermore, the vertical portions 17a and 17b of groove 17 permit an accurate indexation of the two end angular positions of cross-member 1 to be obtained, without it being necessary to provide additional stop means. Moreover, the operation of the press described above is more reliable, since it comprises only a single control means both for the vertical movements and for the pivoting movements of cross-member 1, which reduces by half the risks of breakdown. Finally, if the motor 13 stops or break down during operation, cross-member 1 will stop and remain in the position which it occupies at the moment when the motor 13 stops, which is automatically locked due to lack of power and prevents the screw from rotating.

In an alternative embodiment of the invention, the cam follower member 16 can be carried by vertical column 5 and groove 17 can be formed in cylindrical shaft 6. The invention may be also applied to the embodiments described in U.S. Pat. No. 3,936,251. Thus, in the embodiment shown in FIGS. 1 to 3 of U.S. Pat. No. 3,936,251, it is possible to provide a roller and a groove, respectively similar to roller 16 and groove 17 described in the present text, the groove being for example formed in vertical column 8 and the roller being for example carried by cylindrical sleeve 11. Under these conditions, column 8 must be rigidly fixed to frame 1 of the press and it is possible to dispense with the two bearings 9, jack 27, the two elements 29 and 31, roller 33 and guide 34. Likewise, in the embodiment shown in FIG. 4 of the U.S. Pat. No. 3,936,251, it is possible to provide a roller and a groove, respectively similar to roller 16 and groove 17 described in the present text, the groove being formed for example in the wall of cylindrical shaft 38 and the roller being carried by sleeve 40. Therefore, it is possible to dispense with shaft 42, bearing 44 and jack 46.

What is claimed is:

1. A tire curing press comprising a frame, a mold having an upper part and a lower part supported on said frame, a support fixed to one side of said frame and having a vertical axis, a horizontal cross-member supporting the upper part of said mold, said horizontal cross member being mounted in a cantilever fashion at one of its ends on said support and being able to both pivot about and slide along the vertical axis of the support, a single control means and guide means operatively associated with said single control means to control both the pivoting movements and the sliding movements of said horizontal cross-member, said guide means comprising a cam follower member and a groove forming a cam having two end portions which extend vertically and which are one another offset vertically and angularly in relation to the vertical axis of the support, and an intermediate portion progressively connecting the two end portions of the groove.

2. A press according to claim 1, in which the support comprises two parts able to slide one in the other and to rotate in relation to each other, a first one of the two parts of the support being rigidly fixed to the frame of the press, whereas the second part of the support is rigidly fixed to the cross-member, and wherein the cam follower member is carried by one of the two parts of the support, whereas the groove forming a cam is provided in the other part of the support.

3. A press according to claim 2, wherein the single control means comprises a screw and ball nut system, and a motor for rotating said screw, said motor and said screw being carried by the horizontal cross-member, and a support element to which said ball nut is fixed and which is rotatably mounted without any possibility of axial movement on said one part of the support.

* * * * *